US011240558B2

(12) United States Patent
Rakshit et al.

(10) Patent No.: US 11,240,558 B2
(45) Date of Patent: Feb. 1, 2022

(54) AUTOMATICALLY DETERMINING AND PRESENTING PARTICIPANTS' REACTIONS TO LIVE STREAMING VIDEOS (71) Applicant: INTERNATIONAL BUSINESS MACHINES CORPORATION, Armonk, NY (US)

(72) Inventors: Sarbajit K. Rakshit, Kolkata (IN); Martin G. Keen, Cary, NC (US); John M. Ganci, Jr., Raleigh, NC (US); James E. Bostick, Cedar Park, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 249 days.

(21) Appl. No.: 16/183,955

(22) Filed: Nov. 8, 2018

(65) Prior Publication Data
US 2020/0154166 A1 May 14, 2020

(51) Int. Cl.
*H04N 21/442* (2011.01)
*H04L 29/08* (2006.01)
*H04N 21/2187* (2011.01)

(52) U.S. Cl.
CPC ....... *H04N 21/44218* (2013.01); *H04L 67/22* (2013.01); *H04N 21/2187* (2013.01)

(58) Field of Classification Search
None
See application file for complete search history.

(56) References Cited

U.S. PATENT DOCUMENTS

| 9,854,410 | B2 | 12/2017 | Krasadakis |
| 2011/0225515 | A1 | 9/2011 | Goldman et al. |
| 2011/0225519 | A1 | 9/2011 | Goldman et al. |
| 2014/0304654 | A1* | 10/2014 | Gross ................. G06Q 30/0278 715/811 |
| 2015/0350358 | A1 | 12/2015 | Nguyen et al. |
| 2016/0149841 | A1 | 5/2016 | Lewis et al. |
| 2016/0277802 | A1 | 9/2016 | Bernstein et al. |
| 2016/0286244 | A1* | 9/2016 | Chang ................. H04N 21/2187 |
| 2017/0171614 | A1* | 6/2017 | el Kaliouby ..... H04N 21/44218 |
| 2018/0096367 | A1 | 4/2018 | Zamer et al. |

OTHER PUBLICATIONS

Mell et al., "The NIST Definition of Cloud Computing", NIST, Special Publication 800-145, Sep. 2011, 7 pages.

* cited by examiner

*Primary Examiner* — Justin E Shepard
(74) *Attorney, Agent, or Firm* — Anthony England; Andrew D. Wright; Roberts Calderon Safran & Cole, P.C.

(57) ABSTRACT

A computer-implemented method includes: identifying, by a computing device, one or more participants associated with a live streaming video, wherein the one or more participants are co-located; monitoring, by the computing device, behavior of each of the one or more participants, wherein the monitoring comprises monitoring sensor data associated with the one or more participants; automatically determining, by the computing device, respective reactions of each of the one or more participants based on the monitoring the behavior; and providing, by the computing device, respective visual representations of the respective reactions of each of the one or more participants for display within a user interface that is presenting the live streaming video.

20 Claims, 9 Drawing Sheets

FIG. 7 understand # AUTOMATICALLY DETERMINING AND PRESENTING PARTICIPANTS' REACTIONS TO LIVE STREAMING VIDEOS

BACKGROUND

The present invention generally relates to automatically determining and presenting participants' reactions to live streaming videos and, more particularly, to automatically determining and presenting co-located participants' reactions to live streaming videos based on sensor data and user device activity.

Social media systems provide an Internet-based platform for users to stream and share live video captured in real time. For example, a user may access a social media application using a user device, and from within the social media application, the user can select an option to begin capturing video using the user device and live stream the video. The live streaming video can be shared to a public audience or to a private audience selected by the user (e.g., the user's social network connections within a certain number of degrees, a selected list of individuals on a list, all users except those excluded on a list, etc.). Users may live stream video for various purposes, such as to share experiences of an event, special occasion, social gathering, etc.

SUMMARY

In an aspect of the invention, a computer-implemented method includes: identifying, by a computing device, one or more participants associated with a live streaming video, wherein the one or more participants are co-located; monitoring, by the computing device, behavior of each of the one or more participants, wherein the monitoring comprises monitoring sensor data associated with the one or more participants; automatically determining, by the computing device, respective reactions of each of the one or more participants based on the monitoring the behavior; and providing, by the computing device, respective visual representations of the respective reactions of each of the one or more participants for display within a user interface that is presenting the live streaming video.

In an aspect of the invention, there is a computer program product comprising a computer readable storage medium having program instructions embodied therewith. The program instructions are executable by a computing device to cause the computing device to identify one or more co-located participants associated with a live streaming video, wherein the one or more co-located participants are located within a threshold distance of each other or within a boundary of an event associated with the live streaming video; monitor behavior of each of the one or more participants, wherein the monitoring comprises monitoring sensor data or user device activity associated with the one or more participants; automatically determine respective reactions of each of the one or more participants based on the monitoring the behavior; and provide respective visual representations of the respective reactions of each of the one or more participants for display within a user interface that is presenting the live streaming video.

In an aspect of the invention, a system includes: a processor, a computer readable memory and a computer readable storage medium associated with a computing device; program instructions to identify one or more co-located participants associated with a live streaming video, wherein the one or more co-located participants are located within a threshold distance of each other or within a boundary of an event associated with the live streaming video; program instructions to monitor behavior of each of the one or more participants, wherein the monitoring comprises monitoring sensor data or user device activity associated with the one or more participants; program instructions to automatically determine respective reactions of each of the one or more participants based on the monitoring the behavior; program instructions to generate respective distilled visual representations of each the respective reactions; and program instructions to provide the respective distilled visual representations for display within a user interface that is presenting the live streaming video. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to automatically determining and presenting participants' reactions to live streaming videos and, more particularly, to automatically determining and presenting co-located participants' reactions to live streaming videos based on sensor data and user device activity. As described herein, the reactions (e.g., sentiment, mood, physical/emotional reactions, etc.) of participants that are physically on site and co-located at an event provide a greater level of insight as to the sentiment and mood of the event in relation to the reactions of viewers that are viewing a live stream video of the event from a remote location. Accordingly, aspects of the present invention determine the reaction (e.g., sentiment, mood, physical/emotional reactions, etc.) of users (e.g., participants) that are co-located (e.g., within a threshold proximity of each other) at an event during a live video stream of the event. For example, during a live video stream of an event (e.g., a conference, a sporting event, a special occasion, etc.) aspects of the present invention identify the event participants as a publisher or host of the live video stream and users co-located with the publisher. In embodiments, aspects of the present invention implement privacy settings such that users opt-in to share their locations and provide permission instructions in order to be designated as a participant of an event or a participant associated with a specific publisher.

In embodiments, once participants of a live streaming video have been determined, aspects of the present invention, with the expressed permission of the participants on an opt-in basis, monitor the participants' behavior data. For example, aspects of the present invention monitor the sensor data and/or user device activity data, such as the participants' biometrics data, facial expressions determined using the participants' respective user devices, user device texting/messaging activities of the participants, etc. From this data, aspects of the present invention automatically determine the reactions (e.g., sentiment, mood, physical/emotional reactions, etc.) of the participants during different points in time of the live streaming video. Further, aspects of the present invention distill the participants' reactions into a short phrase (e.g., one or two-word phrase) or a graphic/icon (e.g., an emoticon and/or other type of graphic), and present the distilled version of the participants' reactions within a user interface from which the live streamed video is viewed. Also, aspects of the present invention present the participants' reactions in a different location and with a different style of emphasis than the reactions of viewers. In this way, the reactions of participants that are physically co-located at an event is automatically captured, presented, and emphasized to all viewers of the live video. As such, viewers are able to see the reactions of event participants' that are physically located onsite of the event.

In one or more alternative embodiments, aspects of the present invention also automatically determine the reaction of viewers of a live streamed video, even if the viewer is located remotely from the event. For example, aspects of the present invention automatically determine the reaction of a viewer based on the viewer's biometrics data, facial expressions determined using the viewer's user device, texting/messaging activities of the viewer, etc. Further, aspects of the present invention automatically render and present a distilled representation of the viewer's reaction (e.g., in a user interface of a live stream video viewer application, social media application, etc.).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
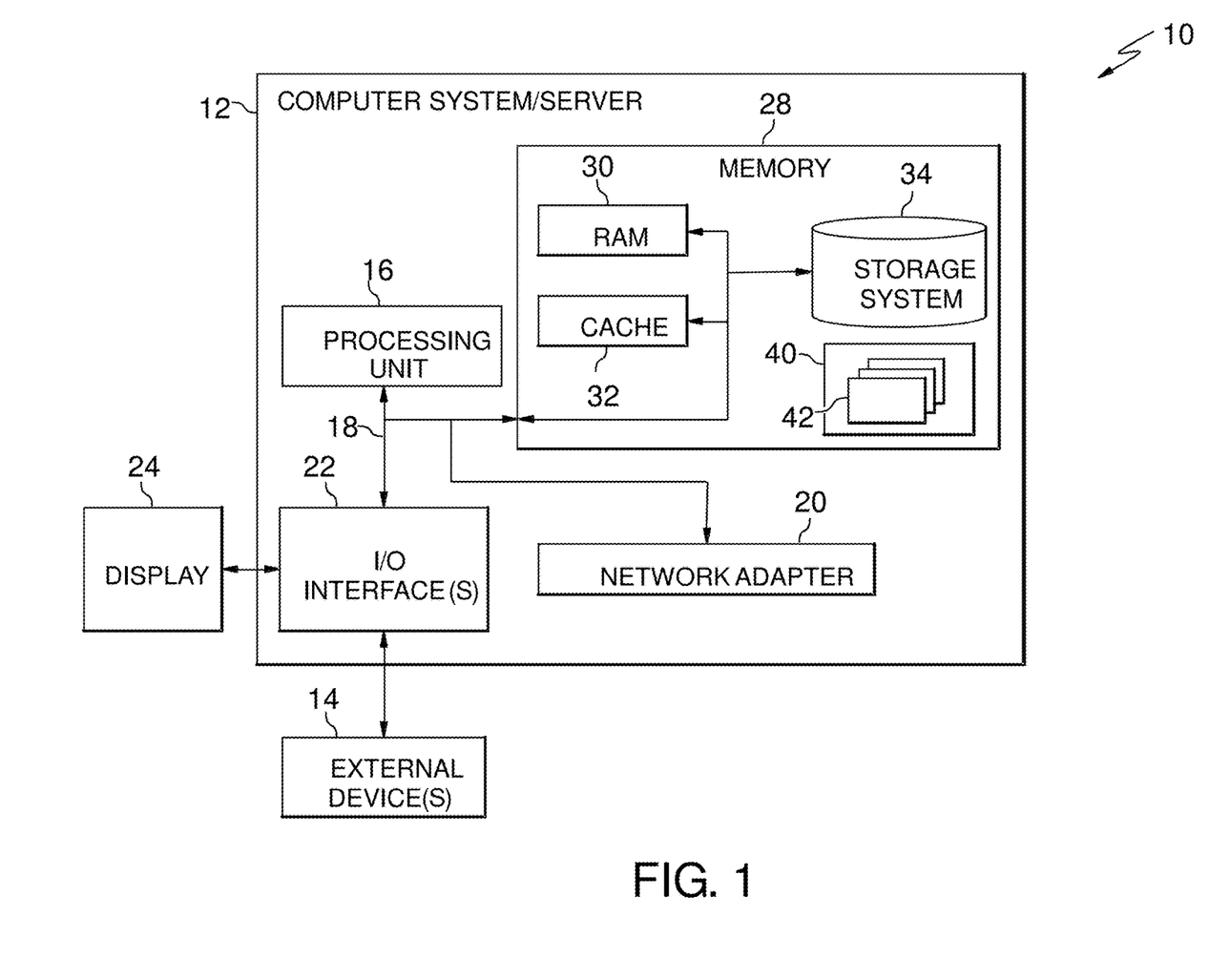
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
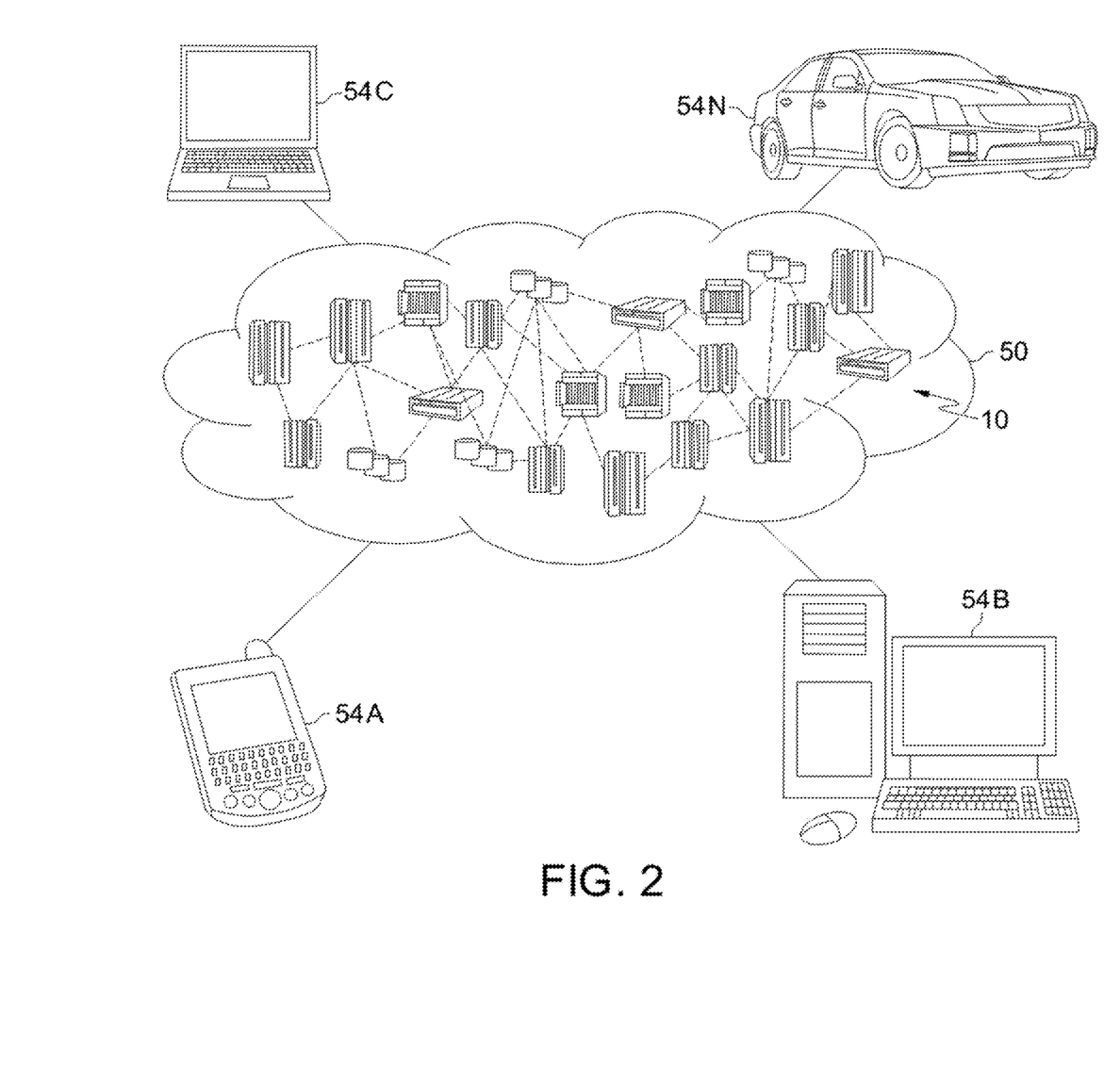
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
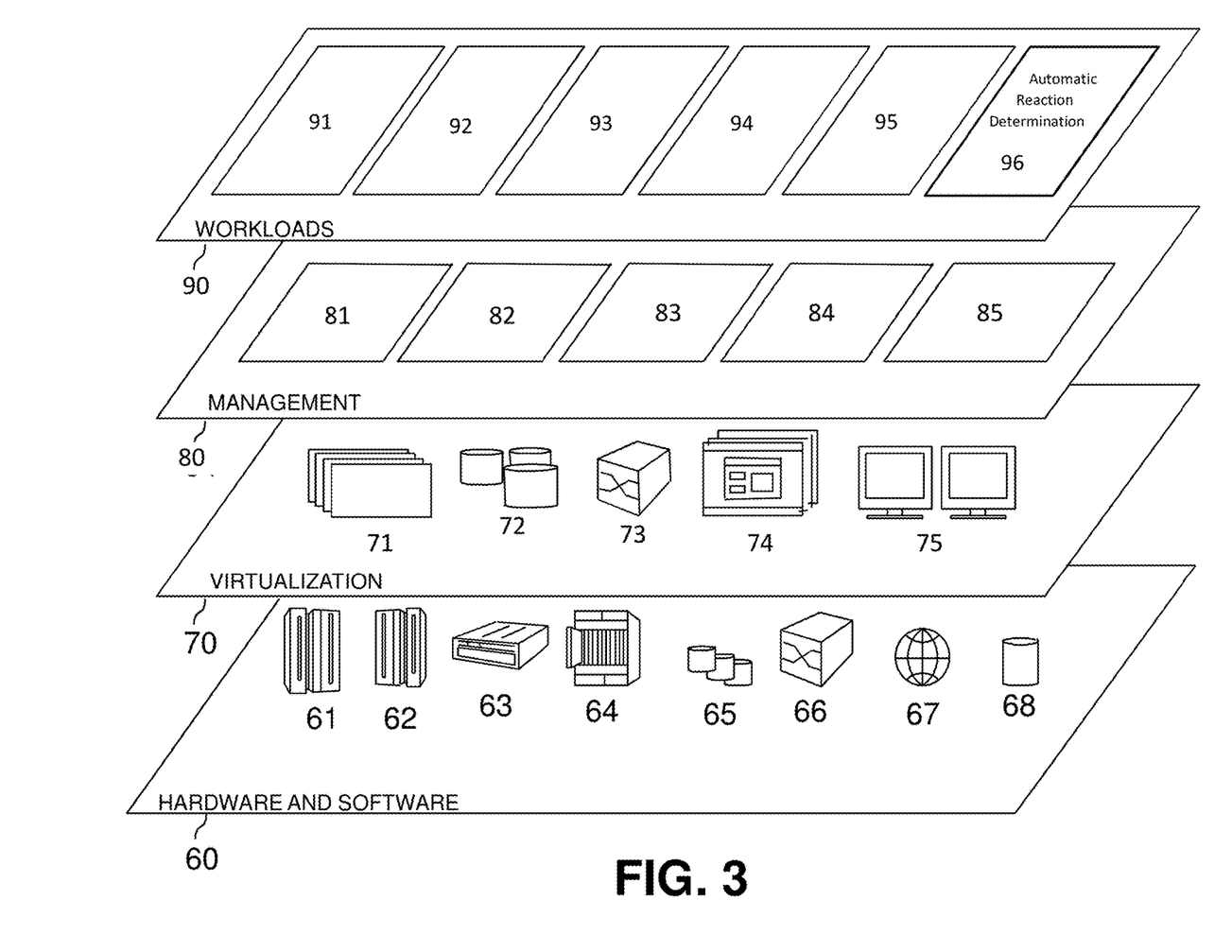
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automatic reaction determination 96.

Referring back to FIG. 1, the program/utility 40 may include one or more program modules 42 that generally carry out the functions and/or methodologies of embodiments of the invention as described herein (e.g., such as the functionality provided by automatic reaction determination 96). Specifically, the program modules 42 may obtain live streaming video metadata, identify co-located participants of the live streaming video based on the metadata, monitor sensor data and user device activity associated with the co-located participants, determine the reaction of the co-located participants based on the sensor data, generate distilled representations of the reactions, and present the distilled representations of the reactions in a user interface of the live streaming video. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a video streaming platform as shown in FIG. 4.

Figure 4A:
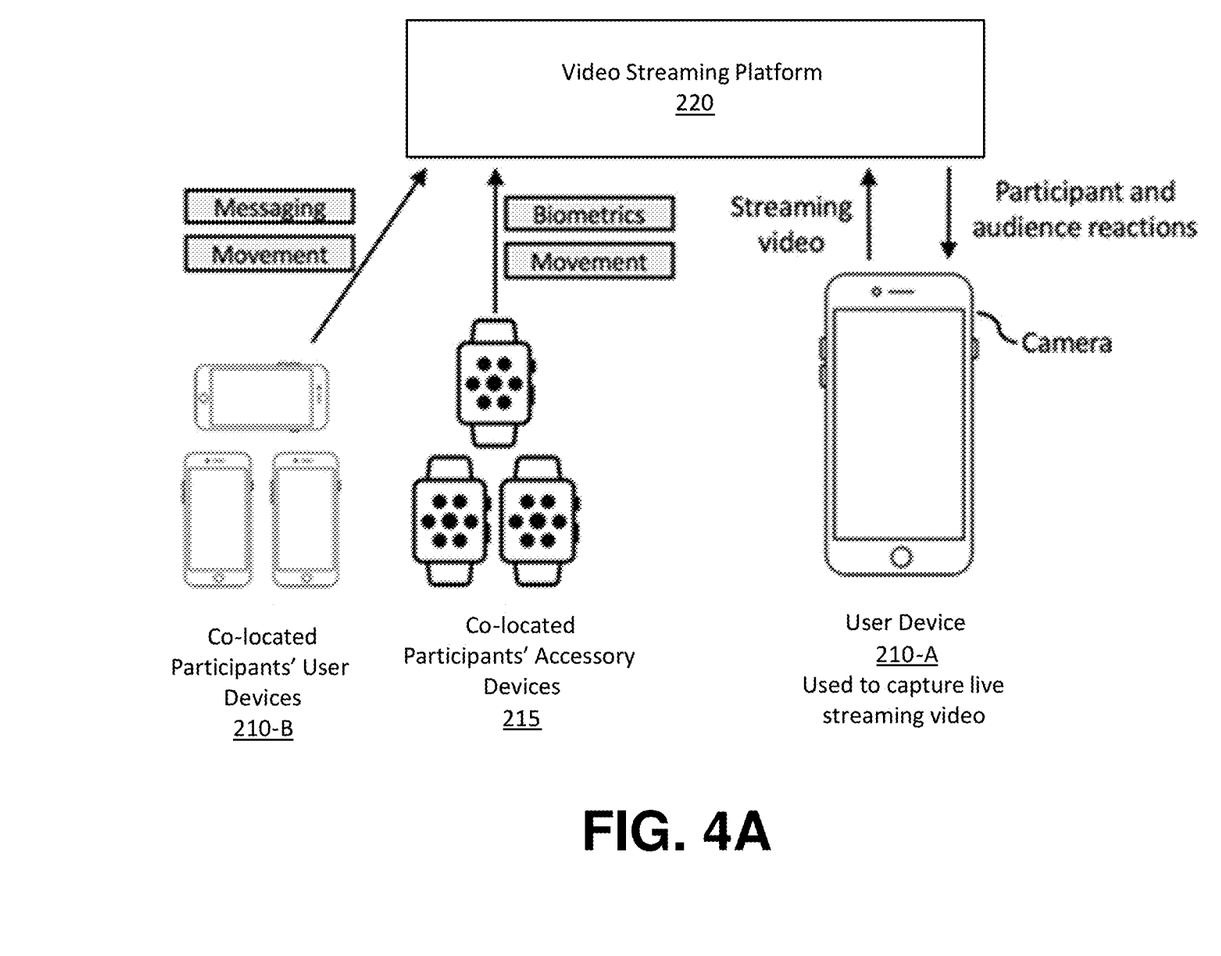
FIGS. 4A-4C show an overview of an example implementation in accordance with aspects of the present invention.
Figure 4B:
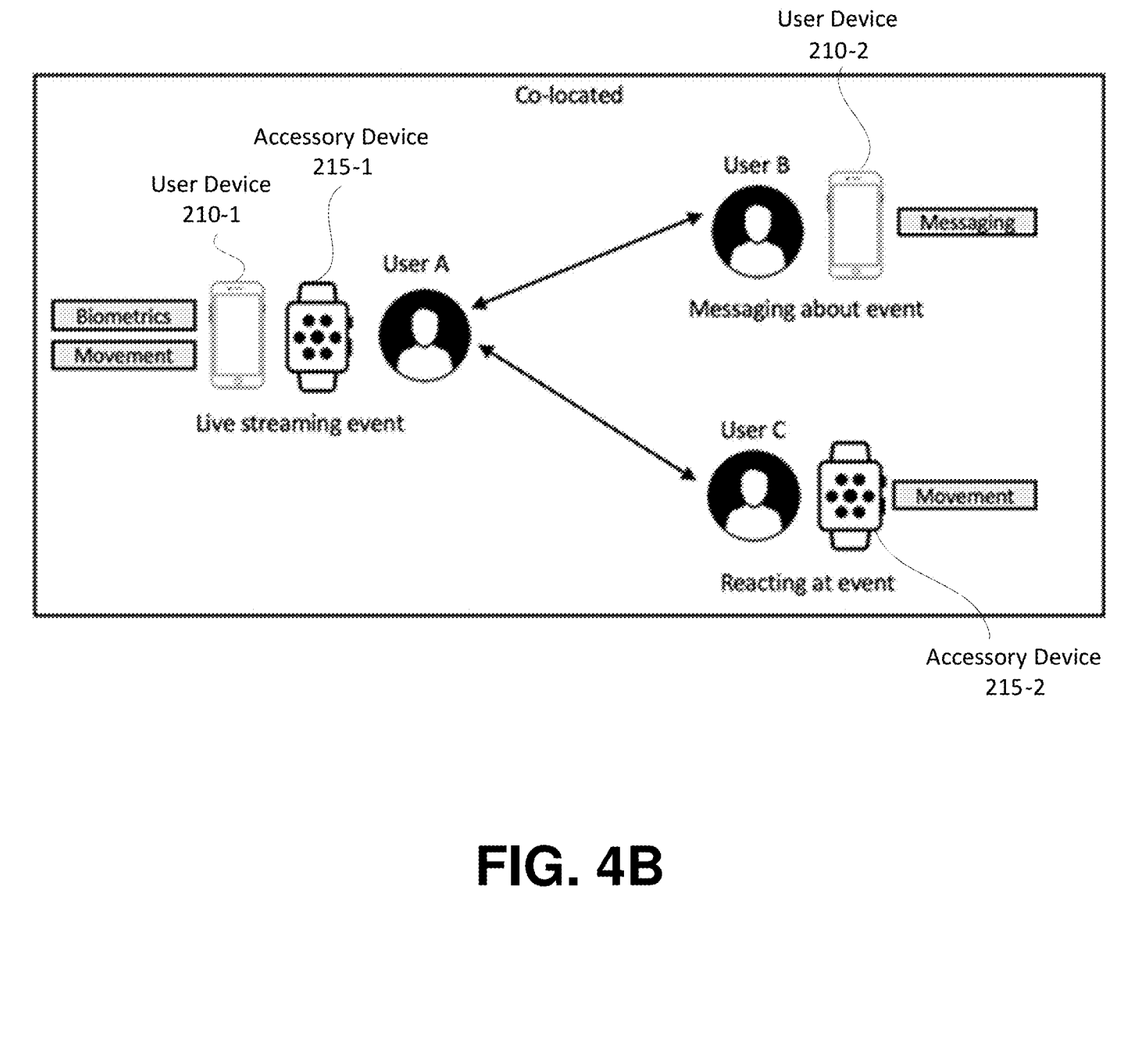
Figure 4C:
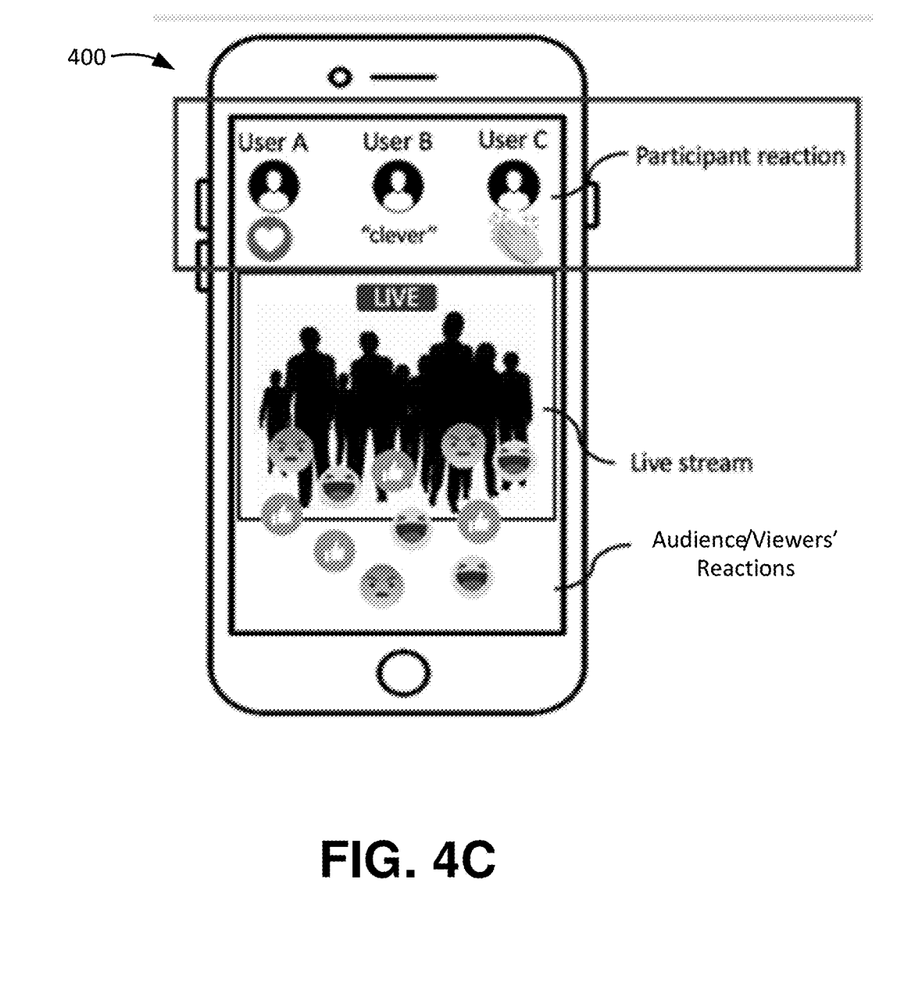

FIGS. 4A-4C show an overview of an example implementation in accordance with aspects of the present invention. As shown in FIG. 4A, a video streaming platform 220 receives streaming video from a user device 210-A. Further, the video streaming platform 220 receives sensor data and/or user device activity from user devices 210-B and accessory devices associated with participants that are co-located at the event associated with the streaming video. In embodiments, the video streaming platform 220 automatically determines the reactions of the participants based on the sensor data and/or user device activity. Further, the video streaming platform 220 determines the reactions of the audience/viewers of the live streaming video (e.g., automatically from sensor data and/user device activity of each of the viewers and/or from manual selection of each viewer's reaction). As described herein, the video streaming platform 220 presents the participant and audience reactions as part of the live video stream.

FIGS. 4B and 4C show an illustrative example of an example implementation in accordance with aspects of the present invention. As shown in the illustrative example of FIG. 4B, multiple users (e.g., User A, User B, and User C) are co-located at an event (e.g., within a threshold distance of each other or within an event boundary). For example, aspects of the present invention determine that the users are co-located based on global positioning system (GPS) data from the users' respective user devices and/or accessory devices, social media check-in activity, etc. User A, User B, and User C are all considered "participants". For example, User A is considered a "participant" as User A is live streaming the event (e.g., to a social media platform) using a user device (e.g., user device 210-1). User B and User C are considered "participants" as User B and User C are co-located with User A. Further, User A, User B, and User C are considered to be participants of the same live stream video based on the acceptance of invitations to the live stream video. As an illustrative example, each user is presented with a list of nearby social network connections and asked to select which co-located connections should be added as "Participants" to the live stream. Each selected participant receives a notification from the social network, and accepts the invitation to be included in the live stream.

Once the participants are determined for the live stream video, in accordance with aspects of the present invention, sensor data and/or user device activity data regarding the reactions of the participants (e.g., User A, User B, and User C) is obtained from the devices associated with the respective participants. For example, biometrics and movement data of User A is obtained using User A's user device (e.g., user device 210-1) and User A's accessory device (e.g., accessory device 215-1). Similarly, messaging activity of User B is obtained from User B's user device (e.g., user device 210-2). As an illustrative example, the User B's messaging activity includes the sending of a message, such as "That was clever." Further, movement activity of User C is obtained using User C's accessory device (e.g., accessory device 215-2).

From the sensor data and/or user device activity data of each user, a distilled representation of each participant's reaction is generated and presented in a user interface from which the live streaming video is viewed (e.g., from within a social media application, or the like). For example, referring to interface 400 in FIG. 4C, User A's reaction is represented as an icon (e.g., of a heart), User B's reaction is represented as a single word (e.g., "clever") and User C's reaction is represented as a graphic (e.g., of hands applauding). In embodiments, aspects of the present invention implement a configurable set of rules/criteria, natural language generation/classification, and/or other techniques for distilling a user's/participant's reaction. In embodiments, the sensor data and/or user device activity of the participants is continuously monitored such that changes in the participants' reactions are automatically determined and graphically represented during the live video streaming at different points in time.

As described herein, the reactions (e.g., sentiment, mood, physical/emotional reactions, etc.) of participants that are physically on site and co-located at an event provide a greater level of insight as to the sentiment and mood of the event in relation to the reactions of viewers that are viewing a live stream video of the event from a remote location. Accordingly, as shown in interface 400, the reaction of the audience or viewers is shown in a separate location as the reaction of the participants. In this way, the reaction of the participants is emphasized and more prominently displayed than the reaction of the viewers. In some embodiments, the reaction of a host or publisher of the live streaming video is visually differentiated from the reaction of other co-located participants and/or from the reaction of remotely located viewers of the live streaming video. In an example embodiment, a reaction score is generated in which the reaction score is more heavily weighed by the participants than by the viewers.

Figure 5:
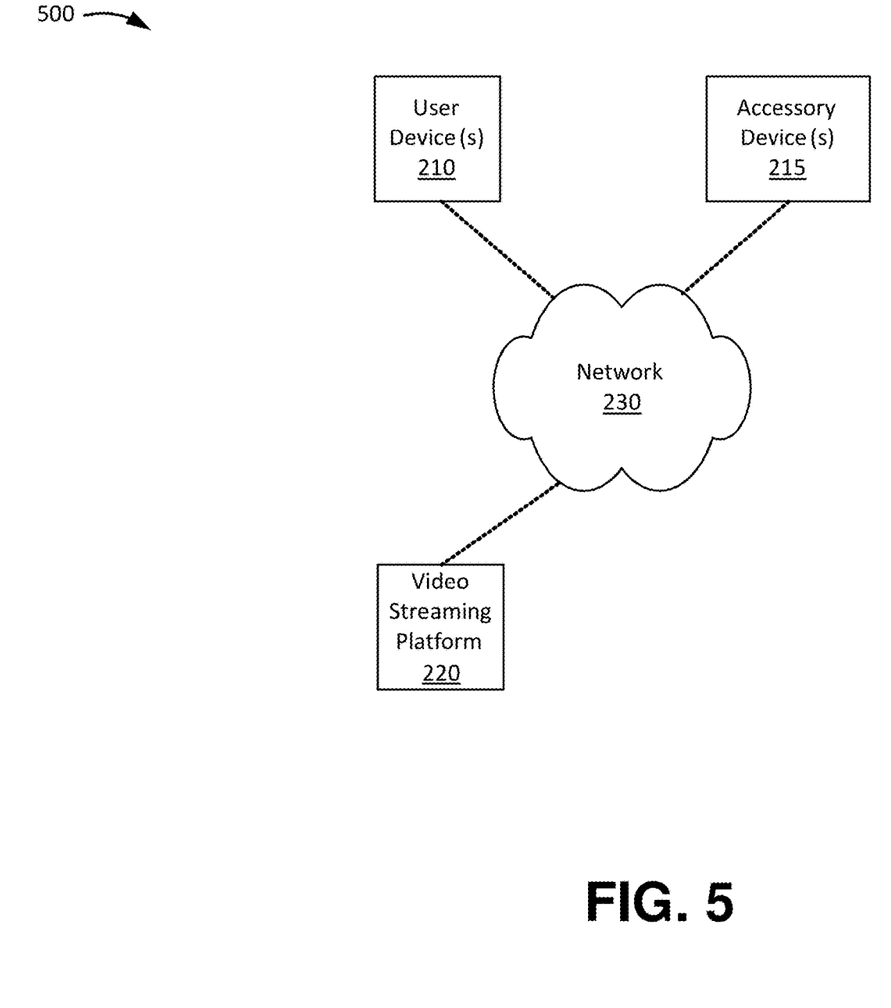
FIG. 5 shows an example environment in accordance with aspects of the present invention.

FIG. 5 shows an example environment in accordance with aspects of the present invention. As shown in FIG. 5, environment 500 includes one or more user devices 210, one or more accessory devices 215, a video streaming platform 220, and a network 230. In embodiments, one or more components in environment 500 may correspond to one or more components in the cloud computing environment of FIG. 2. In embodiments, one or more components in environment 500 may include the components of computer system/server 12 of FIG. 1.

The user device 210 includes a computing device capable of communicating via a network, such as the network 230. In example embodiments, the user device 210 corresponds to a mobile communication device (e.g., a smart phone or a personal digital assistant (PDA)), a portable computer device (e.g., a laptop or a tablet computer), a desktop computer, and/or another type of computing device. In embodiments, the user device 210 is used to access the video streaming platform 220 via an application for streaming video. In embodiments, the user device 210 is used by a participant of an event to capture video for live streaming via the video streaming platform 220. Additionally, or alternatively, the user device 210 is used as a viewer/audience member to view a live streaming video. In embodiments, the user device 210 obtains and provides (e.g., to the video streaming platform 220) sensor data and/or user device activity data relating to the reactions of a participant and/or audience/viewer of the live streaming video.

The accessory device 215 includes one or more wearable computing devices (e.g., smart watches, smart clothing, smart contact lenses, electronic tattoos, etc.) that gather sensor data related to the reactions of a participant and/or viewer/audience member associated with a live streaming video. In embodiments, the accessory device 215 provides the sensor data to the video streaming platform 220.

The video streaming platform 220 includes one or more computing devices (e.g., such as computer system/server 12 of FIG. 1) that hosts live streaming video for broadcasting to one or more user devices 210 (e.g., via a social media platform, or the like). In embodiments, the video streaming platform 220 automatically determines the reactions of participants associated with a live streaming video. For example, in embodiments, the video streaming platform 220 obtains live streaming video metadata, identifies co-located participants of the live streaming video based on the metadata, monitors sensor data and user device activity associated with the co-located participants, determines the reaction of the co-located participants based on the sensor data, generates distilled representations of the reactions, and presents the distilled representations of the reactions in a user interface of the live streaming video.

The network 230 may include network nodes, such as network nodes 10 of FIG. 2. Additionally, or alternatively, the network 230 may include one or more wired and/or wireless networks. For example, the network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 230 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
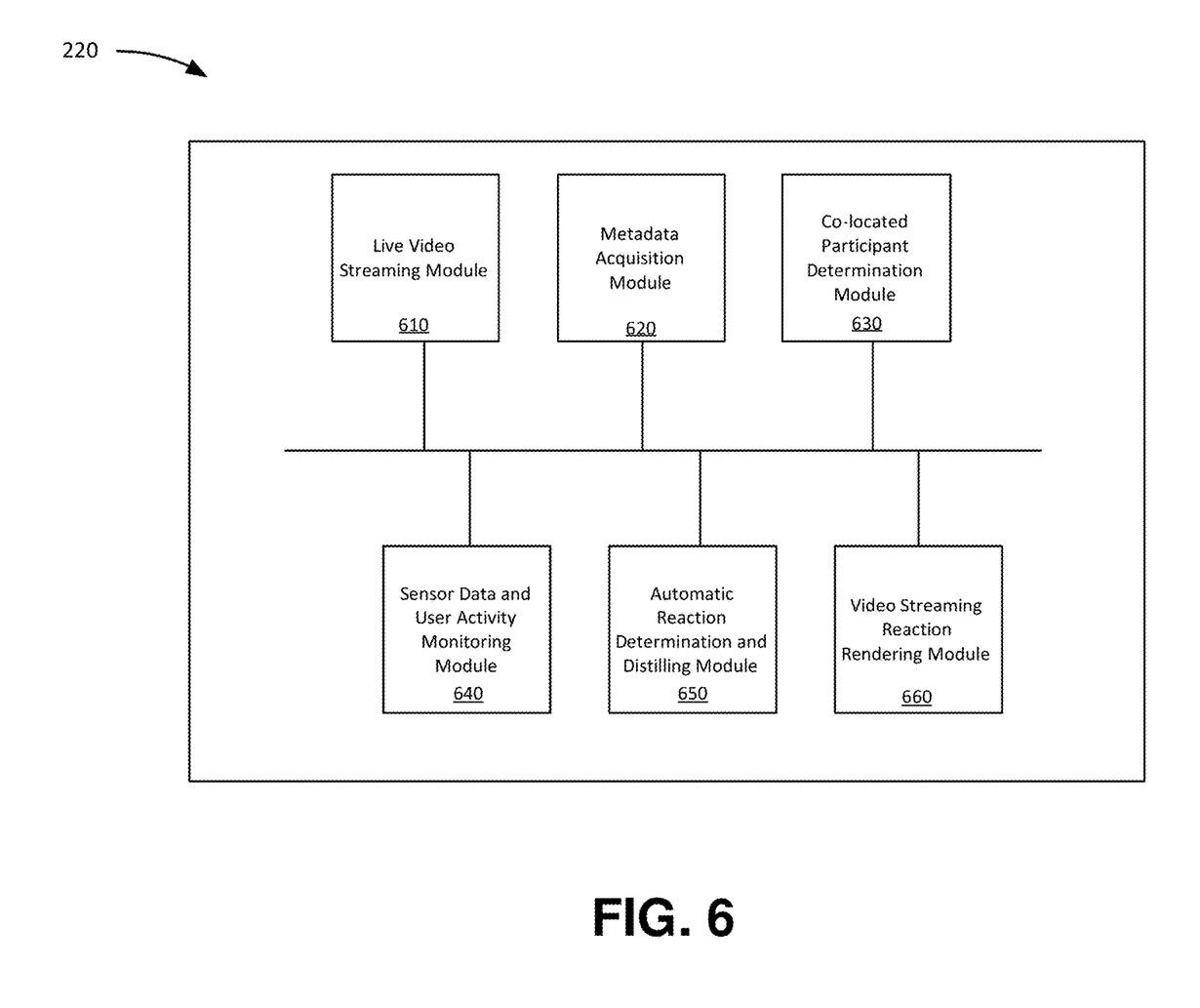
FIG. 6 shows a block diagram of example components of a video streaming platform in accordance with aspects of the present invention.

FIG. 6 shows a block diagram of example components of a video streaming platform 220 in accordance with aspects of the present invention. As shown in FIG. 6, the video streaming platform 220 includes a live video streaming module 610, a metadata acquisition module 620, a co-located participant determination module 630, a sensor data and user activity monitoring module 640, an automatic reaction determination module 650, and a video streaming reaction rendering module 660. In embodiments, the video streaming platform 220 may include additional or fewer components than those shown in FIG. 6. In embodiments, separate components may be integrated into a single computing component or module. Additionally, or alternatively, a single component may be implemented as multiple computing components or modules.

In embodiments, the live video streaming module 610 includes a program module (e.g., program module 42 of FIG. 1) that receives (e.g., from a user device 210) live video for streaming. In embodiments, the live video streaming module 610 streams the live video to an authorized audience (e.g., as selected by the user who has selected to live stream the video).

In embodiments, the metadata acquisition module 620 includes a program module (e.g., program module 42 of FIG. 1) that acquires metadata associated with the live stream video (e.g., streamed by the live video streaming module 610). For example, the metadata acquisition module 620 obtains metadata that is embedded within the live stream video, such as a location of the live stream video. Additionally, or alternatively, the metadata acquisition module 620 obtains other embedded metadata, such as information identifying a description of the event, the participants attending the event, attractions at the event, etc. Additionally, or alternatively, the metadata acquisition module 620 determines the metadata by correlating the location data with a directory of events that identify events based on location.

In embodiments, the co-located participant determination module 630 includes a program module (e.g., program module 42 of FIG. 1) that determines which users are associated with a live stream video and are considered "participants" of the live stream video. For example, the co-located participant determination module 630 determines that a host user that captures the live video to be streamed is a participant. Further, the co-located participant determination module 630 determines that users that are located within a threshold distance of the host user are participants, or that users that are located within a boundary associated with the event of the live video are participants. Additionally, or alternatively, the co-located participant determination module 630 determines the participants based on metadata acquired by the metadata acquisition module 620. Additionally, or alternatively, the co-located participant determination module 630 determines participants based on the acceptance of invitations to be associated with the live stream video. As an illustrative example, a publisher or host of a live streaming video is prompted to select which co-located social network connections should be added as "participants" to the live stream. Each selected participant receives a notification from the social network, and accepts the invitation to be included in (or join) the live stream.

In embodiments, the sensor data and user activity monitoring module 640 includes a program module (e.g., program module 42 of FIG. 1) that obtains and monitors sensor data and user device activity (e.g., from the user devices 210 and/or the accessory devices 215 associated with the participants determined by the co-located participant determination module 630). In embodiments, the sensor data and the user device activity data correspond to the behavior of the participants, which is then used to determine the reactions of the participants. As described herein, the sensor data and user activity monitoring module 640 monitors sensor data, such as biometrics data, movement data, facial expression images, etc. Additionally, or alternatively, the sensor data and user activity monitoring module 640 monitors user device activity data, such as messaging activity, application usage activity, etc.

In embodiments, the automatic reaction determination module 650 includes a program module (e.g., program module 42 of FIG. 1) that automatically determines the reactions (e.g., sentiment, mood, physical/emotional reactions, etc.) of each participant based on the behaviors of the participant (e.g., based on the sensor data and/or user device activity as monitored by the sensor data and user activity monitoring module 640). In embodiments, the automatic reaction determination module 650 automatically determines the reactions without user interaction by correlating the sensor data (e.g., biometrics data, movement data, facial expression data, etc.) with datasets that define the reactions. Additionally, or alternatively, the automatic reaction determination module 650 determines the reactions by applying natural language classification/sentiment tone analysis to words spoken by the participant during the live video stream, and/or to messages composed by the participant during the live video stream. In embodiments, the automatic reaction determination module 650 generates a distilled representation of the reaction using a set of criteria that maps the reaction to a distilled representation (e.g., a visual representation, such as a graphic, icon, emoticon, short phrase, etc.).

In embodiments, the video streaming reaction rendering module 660 includes a program module (e.g., program module 42 of FIG. 1) that renders the participants' reaction automatically determined by the automatic reaction determination module 650 for presenting in a user interface of the live video stream. For example, the video streaming reaction rendering module 660 renders the distilled representation of the reaction and displays the distilled representation of the participants' reactions in a section of the user interface that is separate from the reactions of the viewers/audience members. In this way, the participants' reactions can be differentiated from the reactions of the viewers/audience members.

Figure 7:
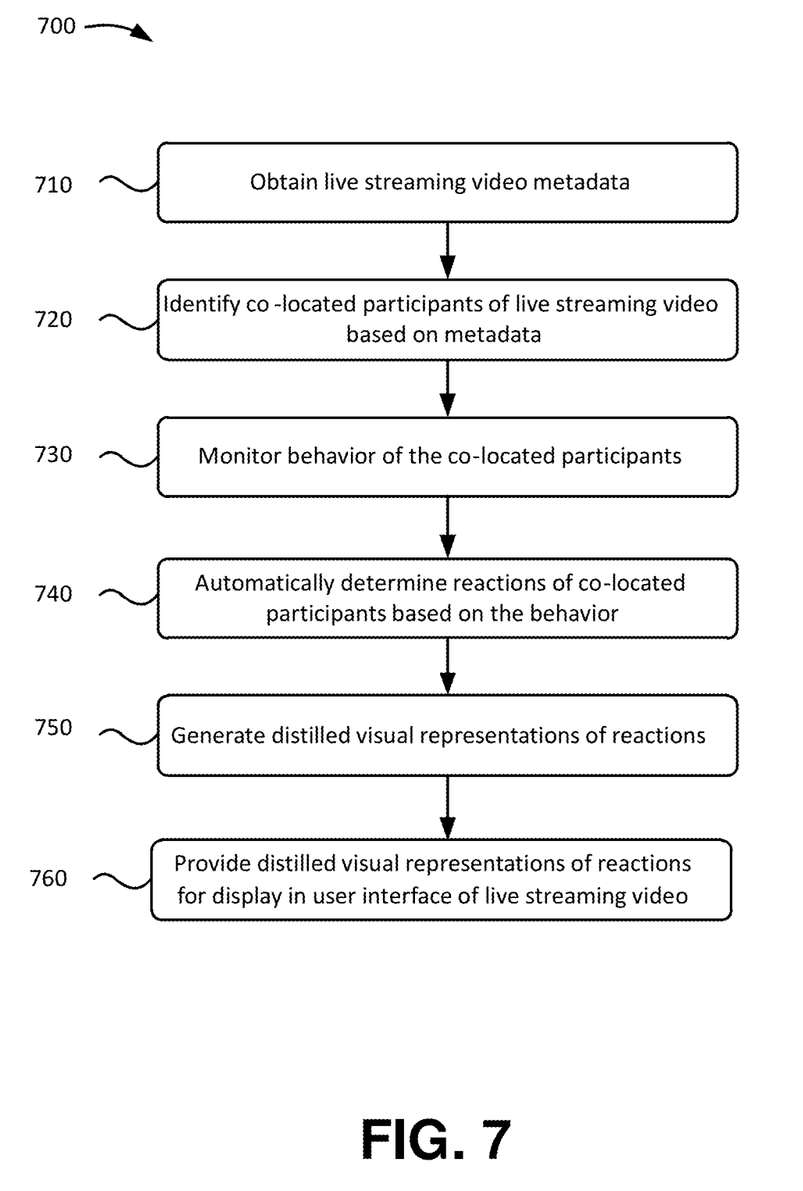
FIG. 7 shows an example flowchart of a process for automatically determining the reactions of participants associated with a live stream video and presenting distilled representations of the reactions in accordance with aspects of the present invention.

FIG. 7 shows an example flowchart of a process for automatically determining the reactions of participants associated with a live stream video and presenting distilled representations of the reactions. The steps of FIG. 7 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 7, process 700 includes obtaining live streaming video metadata (step 710). For example, as described above with respect to the live video streaming module 610 and the metadata acquisition module 620, the video streaming platform 220 acquires metadata associated with a live stream video (e.g., streamed by a user via the live video streaming module 610). For example, the video streaming platform 220 obtains metadata that is embedded within the live stream video, such as a location of the live stream video, information identifying a description of the event, the participants attending the event, attractions at the event, etc. Additionally, or alternatively, the metadata acquisition module 620 determines the metadata by correlating the location data with a directory of events that identify events based on location.

Process 700 also includes identifying co-located participants of the live streaming video based on the metadata and/or invitation responses (step 720). For example, as described above with respect to the co-located participant determination module 630, the video streaming platform 220 which users are associated with a live stream video and are considered "participants" of the live stream video (e.g., based on the location of the users to a host of the live stream video, the location of the users being within a boundary of the event of the live stream video, responses to invitations sent by the host of the live stream video, etc.).

Process 700 further includes monitoring behavior of the co-located participants (step 730). For example, as described above with respect to the sensor data and user activity monitoring module 640, the video streaming platform 220 monitors the behavior of the co-located participants by obtaining and monitoring sensor data and user device activity (e.g., from the user devices 210 and/or the accessory devices 215 associated with the co-located participants determined at step 720). As described herein, the video streaming platform 220 monitors sensor data, such as biometrics data, movement data, facial expression images, etc.

Additionally, or alternatively, the video streaming platform 220 monitors user device activity data, such as messaging activity, application usage activity, etc.

Process 700 also includes automatically determining the reactions of the co-located participants based on the behavior (step 740). For example, as described above with respect to the automatic reaction determination module 650, the video streaming platform 220 automatically determines (e.g., without user interaction) the reactions (e.g., sentiment, mood, physical/emotional reactions, etc.) of each participant based on the sensor data and/or user device activity (e.g., as monitored at step 730). In embodiments, the video streaming platform 220 automatically determines the reactions by correlating the sensor data (e.g., biometrics data, movement data, facial expression data, etc.) with datasets that define the reactions. Additionally, or alternatively, the automatic reaction determination module 650 determines the reactions by applying natural language classification/sentiment tone analysis to words spoken by the participant during the live video stream, and/or to messages composed by the participant during the live video stream.

Process 700 further includes generating a distilled visual representation of the reactions (step 750). For example, as described above with respect to the automatic reaction determination module 650 the video streaming platform 220 generates a distilled representation of the reaction using a set of criteria that maps the reaction to a distilled representation (e.g., a visual representation, such as a graphic, icon, emoticon, short phrase, etc.).

Process 700 also includes providing the distilled visual representation of the reactions for display in a user interface of the live streaming video (step 760). For example, as described above with respect to the video streaming reaction rendering module 660, the video streaming platform 220 renders the participants' reaction automatically determined by the automatic reaction determination module 650 for presenting in a user interface of the live video stream. For example, the video streaming reaction rendering module 660 renders the distilled representation of the reaction and displays/posts the distilled representation of the participants' reactions in a section of the user interface that is separate from the reactions of the viewers/audience members. In this way, the participants' reactions can be differentiated from the reactions of the viewers/audience members.

In embodiments, process steps 730-760 are repeated throughout the streaming of a live video. For example, sensor data and/or user device activity data is continuously monitored such that changes in the participants reactions are captured and presented/posted in a user interface of the live streaming video throughout the duration of the live streaming video. In embodiments, process 700 is used to automatically determine the reaction of audience members/viewers of the live streaming video in addition to or instead of automatically determining the reaction of participants associated with the live streaming video.

In embodiments, aspects of the present invention derive co-located participant reactions to live streaming on social networks; identify a live streaming video feed (e.g., in which the video feed is on a social media website); determine the emotional and physical reaction of the user providing the live stream via biometrics, video analysis, audio analysis, and movement; determining if viewers of the live stream are in a proximity to the user providing the live stream or the event being live streamed; determine the emotional and physical reaction of the viewers of the live stream (e.g., clapping hands); and create and post the reaction of the user and viewers in the live stream feed.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
identifying, by a computer device, a publisher of a live streaming video of an event taking place at a location;
identifying, by the computing device, one or more participants associated with the live streaming video, wherein the one or more participants are co-located with the publisher at the location, the one or more participants and the publisher being different;
monitoring, by the computing device, behavior of each of the one or more participants, wherein the monitoring comprises monitoring sensor data associated with the one or more participants;
automatically determining, by the computing device, respective reactions of each of the one or more participants based on the monitoring the behavior; and
providing, by the computing device, respective visual representations of the respective reactions of each of the one or more participants for display within a user interface that is presenting the live streaming video.

2. The computer-implemented method of claim 1, wherein the respective visual representations of the respective reactions of each of the one or more participants are displayed separately from visual representations of reactions of remote viewers of the live streaming video.

3. The computer-implemented method of claim 1, further comprising obtaining metadata associated with the live streaming video, wherein the identifying the one or more participants is based on the metadata.

4. The computer-implemented method of claim 1, wherein the live streaming video is streamed via a social media platform.

5. The computer-implemented method of claim 1, wherein the respective visual representations comprise distilled visual representations.

6. The computer-implemented method of claim 5, wherein the distilled visual representations are generated by at least one selected from the group consisting of:
   natural language classification; and
   a set of criteria that maps the respective reactions to the distilled visual representations.

7. The computer-implemented method of claim 5, wherein the distilled visual representations included at least one selected from the group consisting of:
   an icon;
   a graphic;
   an emoticon;
   a phrase.

8. The computer-implemented method of claim 1, wherein the behavior of each of the one or more participants is further determined based on respective user device activity of each of the one or more participants, the respective user device activity being messaging by the participant.

9. The computer-implemented method of claim 1, wherein the identifying the one or more participants, the monitoring the behavior, the automatically determining the respective reactions, and the providing the respective visual representations are provided by a service provider on a subscription, advertising, and/or fee basis.

10. The computer-implemented method of claim 1, wherein the computing device includes software provided as a service in a cloud environment.

11. The computer-implemented method of claim 1, further comprising deploying a system, wherein the deploying the system comprises providing a computer infrastructure operable to perform the identifying the one or more participants, the monitoring the behavior, the automatically determining the respective reactions, and the providing the respective visual representations.

12. The method of claim 1, further comprising:
   monitoring, by the computing device, remote behavior of each of one or more remote viewers of the live streaming video, the monitoring of the remote behavior comprises monitoring sensor data associated with the one or more remote viewers; and
   automatically determining, by the computing device, respective reactions of each of the one or more remote viewers based on the monitoring the remote behavior.

13. The method of claim 12, further comprising providing, by the computing device, respective visual representations of the respective reactions of each of the one or more remote viewers for display within the user interface that is presenting the live streaming video,
   wherein the respective visual representations of the respective reactions of each of the one or more co-located participants are displayed separately from the respective visual representations of respective reactions of the remote viewers.

14. A computer program product comprising a computer readable storage medium having program instructions embodied therewith, the program instructions executable by a computing device to cause the computing device to:
   identify a publisher of a live streaming video of an event taking place at a location;
   identify one or more co-located participants associated with the live streaming video, wherein the one or more co-located participants are located within a threshold distance of each other and the publisher, the one or more co-located participants and the publisher being different;
   continuously monitor behavior of each of the one or more participants, wherein the monitoring comprises continuously monitoring sensor data associated with the one or more participants;
   automatically determine respective reactions of each of the one or more participants based on the monitoring the behavior; and
   provide respective visual representations of the respective reactions of each of the one or more participants for display within a user interface that is presenting the live streaming video,
   wherein the identifying the one or more co-located participants comprises presenting to the publisher and currently participating ones of the co-located participants a list of nearby social network connections and asking the publisher and the currently participating ones of the co-located participants to select which of the connections should be added as participants to the live stream.

15. The computer program product of claim 14, wherein the publisher is a host of the live streaming video.

16. The computer program product of claim 15, wherein the one or more participants include social media connections of the publisher of the live streaming video.

17. The computer program product of claim 16, wherein the one or more participants include users that accept invitations to join the live streaming video.

18. The computer program product of claim 14, wherein the respective visual representations of the respective reactions of each of the one or more participants are displayed separately from visual representations of reactions of remote viewers of the live streaming video.

19. A system comprising:
   a processor, a computer readable memory and a computer readable storage medium associated with a computing device;
   program instructions to identify a publisher of a live streaming video of an event taking place at a location, the event being a gathering of people;
   program instructions to identify one or more co-located participants associated with the live streaming video, wherein the one or more co-located participants are located within a boundary of the event, the one or more co-located participants and the publisher being different;
   program instructions to monitor behavior of each of the one or more participants, wherein the monitoring comprises monitoring sensor data or user device activity associated with the one or more participants;
   program instructions to automatically determine respective reactions of each of the one or more participants based on the monitoring the behavior;
   program instructions to generate respective distilled visual representations of each the respective reactions; and
   program instructions to provide the respective distilled visual representations for display within a user interface that is presenting the live streaming video,
   wherein the program instructions are stored on the computer readable storage medium for execution by the processor via the computer readable memory.

20. The system of claim 19, wherein the respective visual distilled representations are displayed separately from visual representations of reactions of remote viewers of the live streaming video.

* * * * *